United States Patent
Sutardja et al.

(10) Patent No.: US 9,306,387 B2
(45) Date of Patent: Apr. 5, 2016

(54) CURRENT LIMITING CIRCUIT AND METHOD FOR LED DRIVER

(71) Applicant: Marvell World Trade Ltd., St. Michael (BB)

(72) Inventors: Sehat Sutardja, Los Altos Hills, CA (US); Wanfeng Zhang, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 314 days.

(21) Appl. No.: 14/040,218

(22) Filed: Sep. 27, 2013

(65) Prior Publication Data

US 2014/0091714 A1    Apr. 3, 2014

Related U.S. Application Data

(60) Provisional application No. 61/707,029, filed on Sep. 28, 2012.

(51) Int. Cl.
| | |
|---|---|
| *H03B 1/00* | (2006.01) |
| *H03K 3/00* | (2006.01) |
| *H02H 9/02* | (2006.01) |
| *H05B 33/08* | (2006.01) |
| *H02M 1/32* | (2007.01) |

(52) U.S. Cl.
CPC . *H02H 9/02* (2013.01); *H02M 1/32* (2013.01); *H05B 33/089* (2013.01); *H05B 33/0884* (2013.01)

(58) Field of Classification Search
USPC .......................................... 327/108–112, 380
See application file for complete search history.

(56) References Cited

U.S. PATENT DOCUMENTS

| | | | | |
|---|---|---|---|---|
| 8,476,843 B2 * | 7/2013 | Yu | ....................... | H05B 33/0815 315/185 R |
| 8,605,123 B2 * | 12/2013 | Oh | ....................... | G09G 3/3426 345/690 |
| 8,952,623 B2 * | 2/2015 | Chen | ....................... | H05B 41/16 315/185 S |
| 8,981,658 B2 * | 3/2015 | Lee | ....................... | H05B 33/0824 315/185 R |
| 9,030,128 B2 * | 5/2015 | Wu | ....................... | H05B 33/0815 315/186 |
| 9,131,577 B2 * | 9/2015 | Oshima | ............... | H05B 33/0848 |
| 2009/0237007 A1 * | 9/2009 | Leng | ................... | H05B 33/0815 315/297 |
| 2012/0126859 A1 * | 5/2012 | Kawamoto | ............ | H03K 17/163 327/108 |

(Continued)

FOREIGN PATENT DOCUMENTS

WO    WO 01/01385 A1    1/2001

OTHER PUBLICATIONS

International Search Report and Written Opinion issued Mar. 18, 2014 in PCT/US2013/062351.

*Primary Examiner* — Adam Houston

(57) ABSTRACT

Aspects of the disclosure provide a circuit that includes a driver circuit and a current limiter circuit. The driver circuit is configured to drive a load with an output current when the load is coupled with the driver circuit. The current limiter circuit is configured to turn on a path to deplete a portion of the output current from the driver circuit in order to prevent a load current flowing through the load from exceeding a current limit.

13 Claims, 3 Drawing Sheets

(56) References Cited

U.S. PATENT DOCUMENTS

| | | | | |
|---|---|---|---|---|
| 2012/0176164 A1* | 7/2012 | Arndt | H01L 23/62 | 327/109 |
| 2014/0084801 A1* | 3/2014 | Lys | H05B 33/0812 | 315/201 |
| 2014/0091714 A1* | 4/2014 | Sutardja | H02M 1/32 | 315/122 |
| 2014/0184077 A1* | 7/2014 | Lee | H05B 33/083 | 315/122 |
| 2015/0123717 A1* | 5/2015 | Feldtkeller | H02H 5/048 | 327/109 |
| 2015/0230309 A1* | 8/2015 | Grajcar | H05B 33/0845 | 315/192 |
| 2015/0263719 A1* | 9/2015 | Iwamizu | H03K 17/04123 | 327/109 |

* cited by examiner

US 9,306,387 B2

CURRENT LIMITING CIRCUIT AND METHOD FOR LED DRIVER

INCORPORATION BY REFERENCE

This present disclosure claims the benefit of U.S. Provisional Application No. 61/707,029, "CURRENT LIMITER CIRCUIT FOR CURRENT CONTROL LED DRIVER" filed on Sep. 28, 2012, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment to replace, for example, fluorescent lamps, bulbs, halogen lamps, and the like.

SUMMARY

Aspects of the disclosure provide a circuit that includes a driver circuit and a current limiter circuit. The driver circuit is configured to drive a load with an output current when the load is coupled with the driver circuit. The current limiter circuit is configured to turn on a path to deplete a portion of the output current from the driver circuit in order to prevent a load current flowing through the load from exceeding a current limit.

In an embodiment, the current limiter circuit includes a current sensor and a switch. The current sensor is configured to sense the load current flowing through the load. The switch is configured to turn on the path when the load current flowing through the load reaches the current limit. Further, the switch includes a transistor that is controlled by a voltage generated based on the sensed load current. In an example, the current sensor is configured to have a resistance determined based on the current limit.

According to an aspect of the disclosure, the driver circuit includes a capacitor that is charged to a voltage limit before a light emitting diode (LED) string is coupled with the driver circuit. The voltage limit is larger than a forward voltage of the LED string. In an embodiment, the driver circuit is configured to output an initial current to discharge the capacitor when the LED string is initially coupled with the driver circuit and is configured to output a controlled current to the LED string after the initial discharging. The current limiter circuit is configured to turn on the path when the LED string is initially coupled with the driver circuit to deplete a portion of the initial current, and is configured to turn off the path after the initial discharging.

Aspects of the disclosure provide a current limiting method. The method includes driving a load by a driver circuit with an output current when the load is coupled with the driver circuit, and turning on a path to deplete a portion of the output current from the driver circuit to prevent a load current flowing through the load from exceeding a current limit.

Aspects of the disclosure also provide a light emitting diode (LED) driving system. The LED driver includes a driver circuit configured to drive an LED string with an output current when the LED string is coupled with the driver circuit, and a current limiter circuit configured to turn on a path to deplete a portion of the output current from the driver circuit to prevent an LED current flowing through the LED string from exceeding a current limit.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
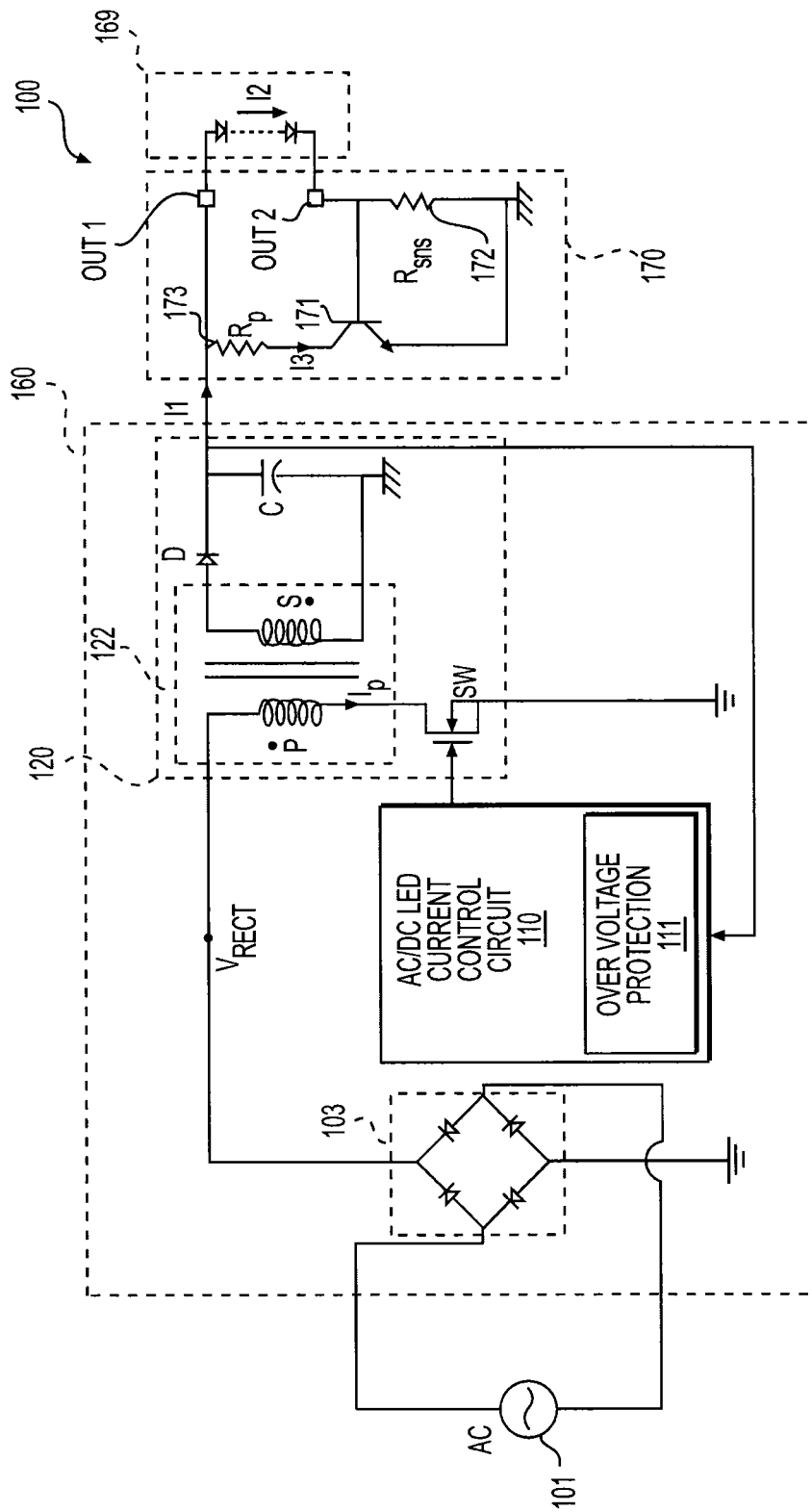
FIG. 1 shows a diagram of an electronic system 100 according to an embodiment of the disclosure.

FIG. 1 shows a diagram of an electronic system 100 according to an embodiment of the disclosure. The electronic system 100 includes a driver circuit 160, a current limiter circuit 170 and a load 169. These elements are coupled together as shown in FIG. 1. The driver circuit 160 is coupled to a power source 101 and is configured to receive electrical power from the power source 101, regulate a power supply to have a desired power characteristic for the load 169, and provide regulated power supply to the load 169. In an example, during a normal operation, the driver circuit 160 provides a power supply having a controlled current to the load 169 that has at least an operational parameter depending on the current. Thus, the driver circuit 160 controls the current provided to the load 169 in order to control the operation of the load 169. Generally, the current output from the driver circuit 160 is within a specific range, such as a range defined by a minimum current and a maximum current. However, under certain circumstances, the current output from the driver circuit 160 may be out of the specific range. The current limiter circuit 170 is configured to limit a current flowing through the load 169, and thus to protect the load 169 from damage.

In an embodiment, the load 169 is swappable. In an example, the electronic system 100 includes an interface component having two connectors OUT1 and OUT2. The load 169 includes two nodes that can be connected to the OUT1 and OUT2, and thus the load 169 is electrically coupled with the rest of the electronic system 100. The load 169 can be pulled out to be disconnected from the two connectors OUT1 and OUT2, and thus to be decoupled from the rest of the electronic system 100, and a new load 169 can be plugged in to be connected with the connectors OUT1 and OUT2 and thus the new load 169 is electrically coupled with the rest of the electronic system 100. Further, the load 169 can be hot-swappable which means the load 169 is swapped without powering down the electronic system 100.

According to an aspect of the disclosure, at the time of a hot-swap, when the new load 169 is plugged in to be connected with the connectors OUT1 and OUT2, an instantaneous current outrushes from the driver circuit 160. The instantaneous current can be larger than the maximum current for example, and then cause the load 169 to be damaged. The current limiter circuit 170 is configured to limit the current flowing through the load 169 below the maximum current for example, and thus to protect the load 169. In an example, when the current flowing through the load 169 is larger than a current limit, such as the maximum current, the current limiter circuit 170 switches on a bleeder path in parallel with the load 169 to allow the outrush current to flow through the bleeder path, and thus limit the current flowing through the load 169 and protect the load 169 from damage.

During a normal operation, in an embodiment, the controlled current is generally smaller than the current limit, and the current limiter circuit 170 switches off the bleeder path to save power.

The electronic system 100 can be any suitable system, such as a lighting system, a fan system, and the like. The power source 101 can be any suitable power source, such as an alternating current (AC) power source, a direct current (DC) power source, and the like.

In the FIG. 1 example, the electronic system 100 is a lighting system in which the load 169 includes a string of light emitting diodes (LEDs). Further, the driver circuit 160 is coupled to an AC power source 101, converts the AC power to a DC power supply, and provides a controlled DC current to the string of LEDs in the load 169 during a normal operation. The string of LEDs emits light having a light intensity, and the light intensity depends on the controlled DC current. The driver circuit 160 controls the DC current in order to control the light intensity emitted by the string of LEDs.

Specifically, in FIG. 1 example, the driver circuit 160 includes a rectifier 103, a control circuit 110, and an energy transfer module 120. These elements are coupled together as shown in FIG. 1. The rectifier 103 rectifies an AC voltage to a fixed polarity, such as to be positive. In the FIG. 1 example, the rectifier 103 is a bridge rectifier. The bridge rectifier 103 receives the AC voltage, and rectifies the received voltage to a fixed polarity, such as to be positive. The rectified voltage $V_{RECT}$ is provided to the following circuits, such as the control circuit 110, the energy transfer module 120, and the like, in the electronic system 100.

The energy transfer module 120 transfers electric energy provided by the rectified voltage $V_{RECT}$ to the load 169 under the control of the control circuit 110. In an embodiment, the energy transfer module 120 is configured to use a magnetic component, such as a transformer, an inductor, and the like to transfer the electric energy. The energy transfer module 120 can have any suitable topology, such as a fly-back topology, a buck-boost topology, a buck topology, a boost topology, and the like. In the FIG. 1 example, the energy transfer module 120 uses a fly-back topology that includes a transformer 122, a switch SW, a diode D and a capacitor C coupled together as shown in FIG. 1. The transformer 122 includes a primary winding (P) coupled with the switch SW to receive the rectified voltage $V_{RECT}$, and a secondary winding (S) coupled with the diode D and the capacitor C to drive the load 169.

The control circuit 110 includes any suitable circuits to detect circuit parameters, such as current and voltage in the electronic system 100, and generate one or more control signals accordingly to control the operation of the electronic system 100. In an example, the control circuit 110 includes a detecting circuit (not shown) configured to detect a current $I_P$ flowing through the primary winding P and the switch SW. Further, the control circuit 110 includes a PWM generation circuit (not shown) configured to generate a pulse width modulation (PWM) signal with pulses having a relatively high frequency, such as in the order of 100 KHz, and the like. The control circuit 110 uses the PWM signal to control the switch SW to transfer the electric energy from the primary winding P to the secondary winding S in the transformer 122.

Specifically, in an example, when the switch SW is switched on, a current $I_P$ flows through the primary winding of the transformer 122, and the switch SW. The polarity of the transformer 122 and the direction of the diode D can be arranged such that there is no current in the secondary winding S when the switch SW is switched on. Thus, the received electric energy is stored in the transformer 122.

When the switch SW is switched off, the current $I_P$ becomes zero. The polarity of the transformer 122 and the direction of the diode D can enable the secondary winding S to deliver the stored electric energy to the capacitor C, and the energy stored in the capacitor C can be used to drive the load 169.

According to an aspect of the disclosure, the LED string in the load 169 is swappable. In an example, the load 169 and the other components of the electronic system 100, such as the driver circuit 160, the current limiter circuit 170 and the like, are assembled into a package to form an LED lighting device to replace, for example, a fluorescent lamp, a halogen lamp, and the like. The LED string can be pulled out of the LED lighting device and replaced with another LED string. Further, in an embodiment, the LED string is hot-swappable. For example, the present LED string can be pulled out and a new LED string can be plugged in while the electronic system 100 remains powered on. The new LED string plugged in can be the same type as the LED string that has been pulled out or can be a different type from the LED string that has been pulled out. In an example, the new LED string has the same number of LEDs in the string as the LED string that has been pulled out. In another example, the new LED string has a different number of LEDs from the LED string that has been pulled out.

In an embodiment, at the time of a hot-swap, when the new LED string is plugged in, an instantaneous current output from the driver circuit 160 is relatively large. Specifically, when the previous LED string is pulled out, because the electronic system 100 is still powered on, the control circuit 110 keeps generating pulses in the PWM signal to repetitively switch on/off the switch SW. Thus, the capacitor C keeps charging and the voltage on the capacitor C raises. In an embodiment, the control circuit 110 includes an over voltage protection module 111 configured to monitor the voltage on the capacitor C, and disable the pulse generation for the PWM signal when the voltage on the capacitor C is too large, such as larger than a voltage limit.

Generally, the voltage limit is higher than a forward voltage of a specific LED string. When the new LED string has fewer number of LEDs than the specific LED string, the voltage on the capacitor C is much higher than the forward voltage of the new LED string, and then the instantaneous current can be larger than a current limit, such as a maximum current, and the like, for the new LED string and can cause damage to the new LED string.

The current limiter circuit 170 senses a current flowing through the load 169, and switches on a bleeder path when the current flowing through the load 169 is larger than a current limit. Specifically, in the FIG. 1 example, the current limiter circuit 170 includes a switch 171, a first resistor 172 and a second resistor 173. These elements are coupled together as shown in FIG. 1. The first resistor 172 is coupled in series with the connector OUT1/OUT2. When a load 169 is plugged in, a current flows through the load 169. The current also flows through the first resistor 172 and a voltage drop on the first resistor 172 is indicative of the current flowing through the load 169.

When the voltage drop on the first resistor 172 is larger than a threshold, the switch 171 switches on a bleeder path. In the FIG. 1 example, the switch 171 is an NPN bipolar junction transistor, and the voltage drop on the first resistor 172 is applied on the base-emitter of the NPN bipolar junction transistor 171. When the voltage drop on the first resistor 172 is larger than a cut-in voltage of the NPN bipolar junction transistor 171 (e.g., P-N junction forward voltage, about 650 mV for silicon bipolar junction transistor at room temperature), the NPN bipolar junction transistor 171 is in active mode. This applied voltage causes the P-N junction between the base and emitter to be forward biased, allowing a current flowing through the NPN bipolar junction transistor 171 from the collector to the emitter. The current flowing through the NPN bipolar junction transistor 171 from the collector to the emitter relates to the voltage on the first resistor 172 exponentially. In an example, an increase of the voltage drop on the first resistor 172 by approximately 60 mV increases the emitter current by a factor of 10.

According to an aspect of the disclosure, the resistance ($R_{sns}$) of the first resistor 172 is suitably designed to protect the LED string. In an example, during a normal operation, the electronic system 100 is specified to provide a normal LED current ($I_{LED}$) to the LED string. Further, during the normal operation, the NPN bipolar junction transistor 171 is turned off due to relatively small voltage drop on the first resistor 172. Thus, the output current from the driver circuit 160 (I1) is the same as the current flowing through the LED string (I2), and the current flowing through the NPN bipolar junction transistor (I3) is zero.

Further, in an example, the LED string is specified with a maximum LED current ($I_{limit}$) that is N times of the normal LED current. N is a multiple factor of the maximum LED current to the normal LED current. In an example, N is a value in the range of [2.5, 3]. Then, in an example, the resistance of the first resistor 172 is calculated using Eq. 1:

$$R_{sns} = \frac{V_{be}}{I_{limit}} = \frac{V_{be}}{N \times I_{LED}} \qquad \text{Eq. 1}$$

Where $V_{be}$ is the cut-in voltage of the NPN bipolar junction transistor, and is about 650 mV for silicon bipolar junction transistor at room temperature. For example, when the normal LED current is 1 A and the multiple factor N is 3, the first resistor 172 is designed to have a resistance of about 217 mΩ.

During a normal operation, the driver circuit 160 outputs the normal LED current to the load 169, and the voltage on the capacitor C is about the forward voltage of the LED string in the load 169. Further, the voltage drop on the first resistor 172 is smaller than the cut-in voltage, and thus the NPN bipolar junction transistor 171 is turned off.

When the load 169 is pulled out, charges are accumulated on the capacitor C and thus raise the voltage on the capacitor C. When the voltage on the capacitor C is large enough to activate the over voltage protection, the pulse generation for the PWM signal is disabled. When a new load 169 is plugged in, the voltage on the capacitor C may be much larger than the forward voltage of the new load 169, for example the new LED string has fewer number of LEDs than the previous LED string. The voltage on the capacitor C causes an initial current outrushing to the load 169 for discharging. When the discharging current via the load 169 is about the maximum LED current, the voltage drop on the first resistor 172 is about the cut-in voltage of the NPN bipolar junction transistor 171 and thus the NPN bipolar junction transistor 171 turns on, and the charges on the capacitor can be discharged via the NPN bipolar junction transistor 171.

Due to the discharging, the voltage on the capacitor C drops and the current flowing through the load 169 decreases. When the voltage drop on the first resistor 172 is below the cut-in voltage, the NPN bipolar junction transistor 171 turns off. The control circuit 110 resumes the pulse generation for the PWM signal, and the electronic system 100 enters the normal operation.

According to an aspect of the disclosure, the NPN bipolar junction transistor 171 provides low cost, high robustness, and fast switching performance. Further, in an example, the second resistor 173 is configured to protect the NPN bipolar junction transistor 171. The resistance of the second resistor 173 is suitably designed to allow the NPN bipolar junction transistor 171 to be the major discharging path.

It is noted that the electronic system 100 can be suitably modified. In an example, the second resistor 173 is not needed. In another example, other suitable switch device, such as a PNP bipolar junction transistor, a metal-oxide-semiconductor field effect transistor (MOSFET), and the like, can be used to replace the NPN bipolar junction transistor 171.

Figure 2:
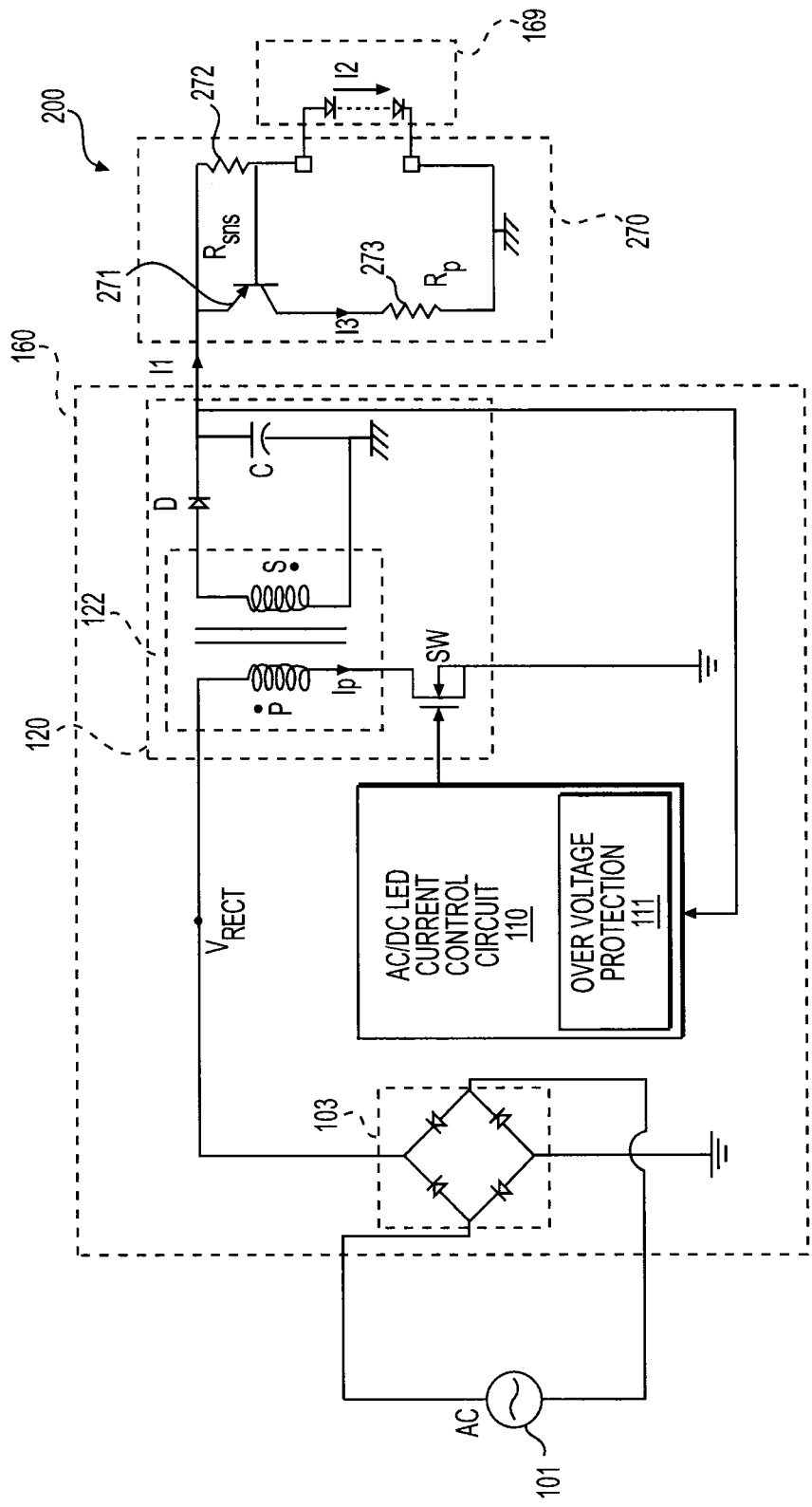
FIG. 2 shows another diagram of an electronic system 200 according to an embodiment of the disclosure.

FIG. 2 shows another diagram of an electronic system 200 according to an embodiment of the disclosure. The electronic system 200 operates similarly to the electronic system 100 described above. The electronic system 200 also utilizes certain components that are identical or equivalent to those used in electronic system 100; the description of these components has been provided above and will be omitted here for clarity purposes. In this embodiment, the current limiter circuit 270 uses a PNP bipolar junction transistor 271 that operates similarly to the NPN bipolar junction transistor 171.

Figure 3:
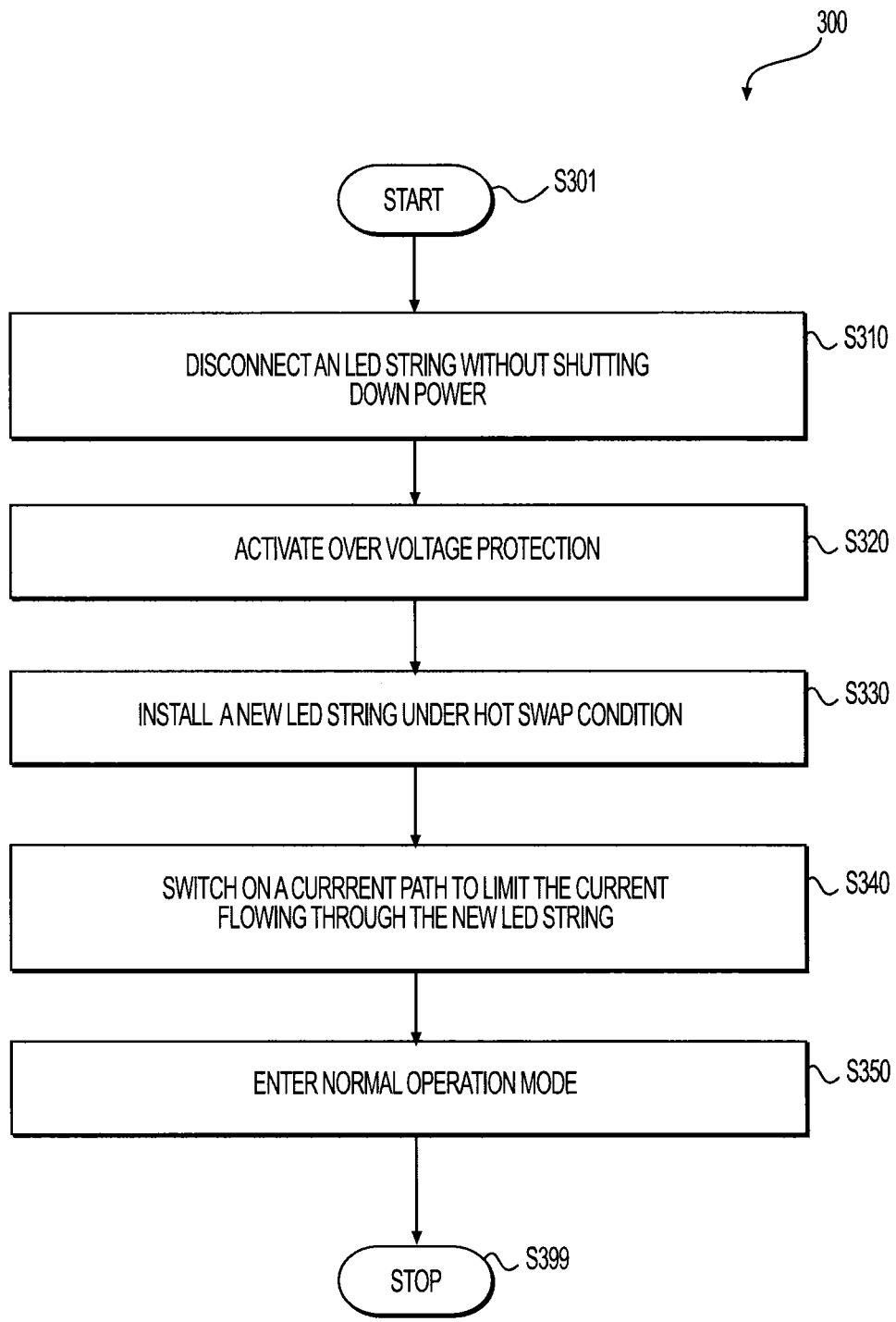
FIG. 3 shows a flowchart outlining a process 300 for swapping a light emitting diode (LED) string according to an embodiment of the disclosure.

FIG. 3 shows a flowchart outlining a process example 300 according to an embodiment of the disclosure. In an example, the process 300 is executed by the electronic system 100 during a hot-swap that replaces an LED string without shutting down the power source 101. The process starts at S301 and proceeds to S310.

At S310, an LED string is pulled out of a lighting system without shutting down a power source that provides power to the lighting system. In the FIG. 1 example, the LED string in the load 169 is pulled out to be disconnected from the connectors OUT1 and OUT2 while the driver circuit 160 remains in the power-up state. Thus, the driver circuit 160 keeps driving a controlled LED current. Because the LED string has been removed, charges are accumulated on the capacitor C and raise the voltage on the capacitor C.

At S320, an over voltage protection is activated. In the FIG. 1 example, when the voltage on the capacitor C reaches a voltage limit, the over voltage protection module 111 activates over voltage protection and disables the pulse generation for the PWM signal. Then, charges stop building up on the capacitor C, and the voltage on the capacitor C remains about the level of the voltage limit.

At S330, a new LED string is installed under hot-swap condition. In the FIG. 1 example, a new LED string is plugged in to be connected with the connectors OUT1 and OUT2. When the voltage on the capacitor C is larger than the forward voltage of the new LED string, the charges on the capacitor C start discharging through the new LED string.

At S340, a current bleeding path to limit the current flowing through the new LED string is switched on. In the FIG. 1 example, the voltage on the capacitor C is larger than the forward voltage of the new LED string, and causes an initial current outrushing to the new LED string. When the current flowing through the load 169 is about the maximum LED current, the voltage drop on the first resistor 172 is about the cut-in voltage for the NPN bipolar junction transistor 171 and thus the NPN bipolar junction transistor 171 turns on. In an example, because of the current amplifying operation of the NPN bipolar junction transistor 171, a majority of the charges on the capacitor C can discharge via the NPN bipolar junction transistor 171, and the current flowing through the new LED string is limited not to exceed the maximum LED current.

At S350, the electronic system enters a normal operation mode after the initial current outrushing. In the FIG. 1 example, after the initial current outrushing, the voltage on the capacitor C reduces to about the forward voltage of the new LED string, then the control circuit 110 resumes the pulse generation for the PWM signal, and the driver circuit 160 resumes providing the controlled current to the new LED string. The controlled current is smaller than the maximum LED current (e.g., about one third of the maximum LED current), thus the voltage drop on the first resistor 172 is smaller than the cut-in voltage for the NPN bipolar junction transistor 171, and the NPN bipolar junction transistor 171 turns off during the normal operation. The process then proceeds to S399 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit, comprising:
   a driver circuit configured to drive a load with an output current when the load is coupled with the driver circuit;
   a current limiter circuit configured to turn on a path to deplete a portion of the output current from the driver circuit in order to prevent a load current flowing through the load from exceeding a current limit;
   a current sensor of the current limiter circuit configured to have a resistance determined based on the current limit and sense the load current; and
   a switch of the current limiter circuit configured to turn on the path when the load current reaches the current limit.

2. The circuit of claim 1, wherein the switch includes a transistor that is controlled by a voltage generated based on the sensed load current.

3. The circuit of claim 1, wherein the driver circuit includes a capacitor that is charged to a voltage limit before a light emitting diode (LED) string is coupled with the driver circuit, and the voltage limit is larger than a forward voltage of the LED string.

4. The circuit of claim 3, wherein the driver circuit is configured to output an initial current to discharge the capacitor when the LED string is initially coupled with the driver circuit and is configured to output a controlled current to the LED string after the initial discharging.

5. The circuit of claim 4, wherein the current limiter circuit is configured to turn on the path when the LED string is initially coupled with the driver circuit to deplete a portion of the initial current, and is configured to turn off the path after the initial discharging.

6. A method, comprising:
   driving a load by a driver circuit with an output current when the load is coupled with the driver circuit; and
   turning on a path to deplete a portion of the output current from the driver circuit to prevent a load current flowing through the load from exceeding a current limit by sensing the load current flowing through the load, using a resistor that has a resistance determined based on the current limit for generating a control voltage based on the sensed load current, and turning on the path, by a transistor, based on the control voltage when the load current flowing through the load reaches the current limit.

7. The method of claim 6, further comprising:
   charging a capacitor to a voltage limit before a light emitting diode (LED) string is coupled with the driver circuit;
   driving the LED string using the energy stored in the capacitor when the LED string is coupled with the driver circuit, the voltage limit being larger than a forward voltage of the LED string.

8. The method of claim 7, further comprising:
   outputting an initial current to discharge the capacitor when the LED string is initially coupled with the driver circuit; and
   outputting a controlled current to the LED string after the initial discharging.

9. The method of claim 8, further comprising:
   turning on the path when the LED string is initially coupled with the driver circuit to deplete a portion of the initial current; and
   turning off the path after the initial discharging.

10. A light emitting diode (LED) driving system, comprising:
    a driver circuit configured to drive an LED string with an output current when the LED string is coupled with the driver circuit;
    a current limiter circuit configured to turn on a path to deplete a portion of the output current from the driver circuit to prevent an LED current flowing through the LED string from exceeding a current limit;
    a current sensor of the current limiter circuit configured to have a resistance determined based on the current limit and sense the LED current flowing through the LED string; and
    a switch of the current limiter circuit configured to turn on the path when the LED current flowing through the LED string reaches the current limit.

11. The LED driving system of claim 10, wherein the switch includes a transistor that is controlled by a voltage generated based on the sensed LED current.

12. The LED driving system of claim 10, wherein the driver circuit includes a capacitor that is charged to a voltage limit before the LED string is coupled with the driver circuit, and the voltage limit is larger than a forward voltage of the LED string.

13. The LED driving system of claim 12, wherein the driver circuit is configured to output an initial current to discharge the capacitor when the LED string is initially coupled with the driver circuit and is configured to output a controlled current to the LED string after the initial discharging, and the current limiter circuit is configured to turn on the path when the load is initially coupled with the driver circuit to deplete a portion of the initial current, and is configured to turn off the path after the initial discharging.

* * * * *